(12) United States Patent
Tornow et al.

(10) Patent No.: US 12,183,870 B2
(45) Date of Patent: Dec. 31, 2024

(54) METHOD FOR PRODUCING A CATHODE APPARATUS, METHOD FOR PRODUCING AN ELECTRODE ASSEMBLY, AND BATTERY

(71) Applicant: VOLKSWAGEN AKTIENGESELLSCHAFT, Wolfsburg (DE)

(72) Inventors: Alexander Tornow, Ummern (DE); Sven Rathmann, Braunschweig (DE); Kai Stuehm-Van Doren, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 667 days.

(21) Appl. No.: 17/291,801

(22) PCT Filed: Oct. 21, 2019

(86) PCT No.: PCT/EP2019/078545
§ 371 (c)(1),
(2) Date: May 6, 2021

(87) PCT Pub. No.: WO2020/094375
PCT Pub. Date: May 14, 2020

(65) Prior Publication Data
US 2022/0029189 A1    Jan. 27, 2022

(30) Foreign Application Priority Data

Nov. 7, 2018   (DE) .................. 10 2018 219 000.3

(51) Int. Cl.
*H01M 10/04*    (2006.01)
*H01M 4/04*    (2006.01)
(Continued)

(52) U.S. Cl.
CPC ..... *H01M 10/0459* (2013.01); *H01M 4/0435* (2013.01); *H01M 4/139* (2013.01);
(Continued)

(58) Field of Classification Search
None
See application file for complete search history.

(56) References Cited

U.S. PATENT DOCUMENTS 4,063,978 A   12/1977   Badger et al.
4,798,931 A   1/1989   Hess, III
(Continued)

FOREIGN PATENT DOCUMENTS

AT          363 533 B        8/1981
CN        105119009 A       12/2015
(Continued)

OTHER PUBLICATIONS

English translation of DE10201055608 (Year: 2010).*
(Continued)

*Primary Examiner* — Lucas J. O'Donnell
(74) *Attorney, Agent, or Firm* — PEARL COHEN ZEDEK LATZER BARATZ LLP (57) ABSTRACT

The invention relates to a method for producing a cathode apparatus (16) for a battery (8), especially of a motor vehicle (2), whereby a cathode strip (20) is provided, whereby a cathode (16a) is cut out of the cathode strip (20), whereby the cathode (16a) is placed between two strip-shaped separator foils (16d), and whereby, in a joint step, the two separator foils (16d) are cut to size in an area that protrudes beyond the cathode (16a), thereby forming appropriate separator foil cutouts (16f), and these two separator foil cutouts (16f) are also joined to each other in this area, especially fused together. Furthermore, the invention relates to a method for producing a cathode apparatus (16), whereby
(Continued)

a single strip-shaped separator foil (16d) is folded and arranged on the cathode (16a) in such a way that the folded edge of the separator foil (16d) adjoins a contact face (38) of the cathode (16a) and so that the cathode (16a) is covered on both sides by a separator foil section (16g) of the separator foil (16d). Furthermore, the invention relates to a method for producing an electrode assembly (12) having such a cathode apparatus (16), to a battery (8) having such an electrode assembly (12), as well as to a motor vehicle (2) having such a battery (8).

10 Claims, 6 Drawing Sheets

(51) Int. Cl.
    *H01M 4/139*     (2010.01)
    *H01M 10/0525*     (2010.01)
    *H01M 10/0583*     (2010.01)
    *H01M 10/0585*     (2010.01)
    *H01M 50/406*     (2021.01)
    *H01M 50/46*     (2021.01)
    *H01M 4/02*     (2006.01)

(52) U.S. Cl.
    CPC ... *H01M 10/0525* (2013.01); *H01M 10/0583* (2013.01); *H01M 10/0585* (2013.01); *H01M 50/406* (2021.01); *H01M 50/46* (2021.01); *H01M 2004/028* (2013.01); *H01M 2220/20* (2013.01)

(56) References Cited

U.S. PATENT DOCUMENTS

| | | | |
|---|---|---|---|
| 4,945,203 | A | 1/1990 | Soodak et al. |
| 6,103,050 | A | 8/2000 | Krueger |
| 2015/0202647 | A1 | 7/2015 | Watanabe et al. |
| 2016/0013468 | A1 | 1/2016 | Ku et al. |
| 2018/0323416 | A1 | 11/2018 | Schlund et al. |

FOREIGN PATENT DOCUMENTS

| | | |
|---|---|---|
| CN | 107000323 A | 8/2017 |
| DE | 10 2010 055 608 A1 | 6/2012 |
| DE | 10 2014 113 588 A1 | 3/2016 |
| DE | 10 2015 218 533 A1 | 3/2017 |
| DE | 10 2016 214 239 A1 | 2/2018 |
| EP | 2 892 102 A1 | 7/2015 |
| JP | 2005129366 A | 5/2005 |
| JP | 2009-289418 A | 12/2009 |
| JP | 2012-160352 A | 8/2012 |
| JP | 2012174453 A | 9/2012 |
| JP | 2012-204070 A | 10/2012 |

OTHER PUBLICATIONS

English translation of DE102014113588 (Year: 2014).*
Derwent abstract of JP2015232966A (Year: 2015).*
Search Report of German Patent Application No. 10 2018 219 000.3 mailed Jul. 18, 2019.
International Search Report of PCT Application No. PCT/EP2019/078545 mailed Jan. 29, 2020.
Search Report for Chinese Patent Application No. 201980073458.0, dated Feb. 27, 2024.
Search Report for Chinese Patent Application No. 201980073458.0, dated Aug. 28, 2024.
Wen Zhou "Food Packaging Technology" Aug. 31, 2017, pp. 76-78 Textbook for the 13th Five-Year Plan for Higher Education, Vocational Colleges and Universities, Beijing: China Light Industry Press.

* cited by examiner

METHOD FOR PRODUCING A CATHODE APPARATUS, METHOD FOR PRODUCING AN ELECTRODE ASSEMBLY, AND BATTERY

CROSS-REFERENCE TO RELATED APPLICATIONS

This application is a National Phase Applications of PCT International Application No. PCT/EP2019/078545, International Filing Date Oct. 21, 2019, claiming priority of German Patent Application No. 10 2018 219 000.3, filed Nov. 7, 2018, which is hereby incorporated by reference.

FIELD OF THE INVENTION

The invention relates to a method for producing a cathode apparatus for a battery, especially of a motor vehicle, whereby a cathode strip is provided and a cathode is cut out of the cathode strip. Moreover, the invention relates to a method for producing an electrode assembly, to a battery having such an electrode assembly as well as to a motor vehicle having such a battery.

BACKGROUND OF THE INVENTION

An electrically powered motor vehicle typically has a battery (traction battery) that supplies an electric motor with power in order to propel the vehicle. In this context, an electrically powered motor vehicle refers especially to an electric vehicle that stores the required drive energy only in the battery (BEV, battery electric vehicle), to an electric vehicle with a range extender (REEV, range extended electric vehicle), to a hybrid electric vehicle (HEV) and/or to a plug-in hybrid vehicle (PHEV).

Such a (traction) battery has at least one battery cell which holds an electrode assembly having a plurality of cathodes and anodes, whereby the cathodes and the anodes are, for example, stacked on top of each other, and whereby a separator is arranged between each of the cathodes and the anodes.

A method for producing an electrode assembly of a battery cell is known, for instance, from German patent application DE 10 2015 218 533 A1. Here, a strip-shaped first electrode foil is cut to size on a first side so as to expose a first contact tab, which is provided for contacting the first electrode foil in the battery cell. A second electrode, especially a cathode, having a second contact tab is cut out of a second electrode foil and placed between two separator foils. Subsequently, in areas that extend beyond the second electrode, the two separator foils are joined to each other, for example, by means of lamination or adhesion, thereby forming a first stack arrangement.

The first electrode foil and the stack arrangement are laid on top of each other in a subsequent step, whereby the first contact foil and the stack arrangement are aligned relative to each other in such a way that their contact tabs are offset relative to each other, thus creating an electrode assembly. This electrode assembly is cut to size.

SUMMARY OF THE INVENTION

The invention is based on the objective of putting forward a suitable method for producing a cathode apparatus as well as a suitable method for producing an electrode assembly. In particular, the methods should be as uncomplicated as possible and/or one of the cathodes of the cathode apparatus should be held as securely as possible so as not to slip. Moreover, a battery having such an electrode assembly and a motor vehicle with such a battery are to be put forward.

Regarding the method for producing the cathode apparatus, the objective is achieved according to the invention by the features of claim 1 as well as by the features of claim 2. Regarding the method for producing an electrode assembly, the objective is achieved according to the invention by the features of claim 7. Regarding the battery and the motor vehicle, the objective is achieved according to the invention by the features of claim 8 and claim 9, respectively. Advantageous embodiments and refinements are the subject matter of the subordinate claims.

A first variant of a method is suitable and configured for producing a cathode apparatus for a battery. In particular, the battery is intended as a (traction) battery of an electrically powered motor vehicle. The battery is, for example, a lithium-ion battery.

A cathode strip is created in a first step. Then, in a subsequent second step, a cathode is cut out of this cathode strip. For example, the cathode strip is wound up on a roll (coil) and is unwound in order for the cathode to be cut out of it. Advantageously, the cathode is cut out at the unwound end of the cathode strip. The cathode is cut, for instance, mechanically. Advantageously, a blade or a stamping tool is used for this purpose.

The cathode that is cut out of the cathode strip is in the form of a sheet, thus flat, that is to say, in one spatial direction, the cathode has an extension that is relatively small in comparison to its extension in a plane that is oriented perpendicular to said spatial direction. Moreover, a first face of the cathode advantageously has a contact for establishing electric contact when the battery is in its installed state.

In a third step, the cathode is placed between two strip-shaped separator foils. In particular, the two separator foils are each unwound from a roll (coil). In a suitable manner, the cathode is placed between the two separator foils in such a way that the flat cathode sides that adjoin the first face are completely covered by the two separator foils. In this context, the contact of the cathode advantageously projects sideways beyond the two separator foils, that is to say, in a direction perpendicular to a lengthwise direction of the strip-shaped separator foil and in a plane spanned by the cathode, and it is thus exposed. For example, the edge of the separator foils that extends in the lengthwise direction of the strip is flush with the first face. Here, the lengthwise direction of the strip is the main direction of the extension of each strip-shaped separator foil.

In a joint fourth step, the two separator foils are cut to size, thereby forming appropriate separator foil cutouts, and then these two separator foil cutouts are also joined to each other. The cutting is carried out in an area of the two separator foils that protrudes beyond the cathode. During the cutting, the two separator foil cutouts are joined to each other, especially fused together.

Therefore, in summary, the cutting as well as the joining of the two separator foil cutouts are advantageously carried out in one work step, especially at the same time, which is why the production effort and the production costs of such a cathode apparatus are reduced.

According to an advantageous refinement, a heated rotary blade or a laser is used in order to achieve this. The heated rotary blade or the laser cuts the two separator foils in the areas intended for this purpose, whereby the two separator foil sections fuse together as a result of the thermal effect of the laser or of the heated rotary blade. For this purpose, the laser, especially its intensity and its focal diameter, are set as a function of the properties of the separator foil, for example, its reflection properties or its material. In the area that is to be melted by means of the laser, the two separator foil cutouts have to be as close to each other as possible, especially a so-called zero gap should be formed. Towards this end, a mask, for example, is used by means of which the two separator foil cutouts are pressed onto each other.

The separator foils are cut, for instance, only in front of or behind the cathode relative to the lengthwise direction of the strip. In this manner, the two strip-shaped foils are cut to length. As an alternative to this, the cutting and joining are carried out in areas that are facing away from the first face. In this manner, the joined separator foil cutouts form a pocket in which the cathode is accommodated.

As another alternative, the separator foils are cut and joined in an area that extends along the entire circumference of the cathode, preferably except for those places where the separator foils are arranged on or adjacent to the contact. This is also referred to as the contour trimming.

In any case, owing to the fusing of the two separator foil cutouts, the cathode is prevented from slipping relative to the separator foils or else the risk of this occurring is at least reduced. Consequently, when the cathode apparatus is used in an electrode assembly, damage to and/or a short circuit of the cathode with an anode due to the cathode slipping are advantageously prevented or else such a risk is at least reduced.

According to an alternative second variant of the method for producing the cathode apparatus for a battery, especially of a motor vehicle, the first two steps are carried out analogously to the first variant of the method for producing the cathode apparatus. In other words, a cathode is cut out of a cathode strip that has been provided.

In a subsequent third step, a single strip-shaped separator foil is folded and arranged on the cathode in such a way that the folded edge of the separator foil adjoins a contact face of the cathode and so that the cathode is covered on both sides by a separator foil section of the separator foil.

Here, the contact face of the cathode is advantageously the face that is opposite from the first face, especially running parallel to it. The two separator foil sections preferably cover the cathode completely, preferably except for the contact arranged on the first face.

According to a first embodiment of the second variant of the method, the strip-shaped separator foil is folded in such a way that the folded edge runs along the lengthwise direction of the strip.

Subsequent to the separator foil being arranged on the cathode, in a joint step, the separator foil is cut to size in an area of the faces of the cathode in which the separator foil extends beyond the cathode, said area facing away from the contact face, and then the two separator foil sections are joined to each other, especially fused together. In a manner that is analogous to the first variant of the method, the laser or a heated rotary blade is used for this purpose.

According to an advantageous refinement of the first variant and/or of the first embodiment of the second variant of the method, the cathode is laminated with the two separator foil cutouts or with the separator foil sections in one single step before the separator foil or onto the separator foils is/are cut to size. This holds the cathode securely between the separator foil cutouts or between the separator foil sections.

Advantageously, so-called laminating rollers are used to laminate the cathode with the separator foil sections or with the separator foil cutouts, a process in which these laminating rollers exert a pressure onto the separator foil sections or the separator foil cutouts. Moreover, the laminating rollers advantageously also press the separator foil sections or the separator foil cutouts onto each other in an area in front of or behind the cathode relative to the lengthwise direction of the strip. As a result, the distance between the two separator foil sections or the separator foil cutouts is relatively small, and in particular, the two separator foil sections or the separator foil cutouts have a zero gap relative to each other. Consequently, the separator foil sections or the separator foil cutouts can be fused in this area by means of a laser without the need to use a mask. Only if the separator foil sections or the separator foil cutouts are to be fused together in an area adjacent to the cathode, in other words, in an area of the first face and/or of the contact face by means of a laser, is a mask necessary for these areas.

According to a second embodiment of the second variant of the method, the strip-shaped separator foil is folded in such a way that its folded edge runs perpendicular to the lengthwise direction of the strip. Subsequently, the cathode is placed between the separator foil sections and the separator foil is cut to size. In this process, the separator foil is especially cut off by means of a so-called crosscut, that is to say, perpendicular to the lengthwise direction of the strip. Preferably, the end of the strip, in other words, the end of the separator foil, is flush with the first face of the cathode. As a result, it is advantageous that there is only a need for the transversal cut, namely, cutting the separator foil to length.

Subsequently, the cathode is laminated with the two separator foil sections, thus securing the cathode against slipping. Moreover, in order to secure the cathode from slipping, the two separator foil sections are also joined to each other, preferably fused together, in an area of the cathode faces that adjoin the contact face.

The advantages of the second variant of the method especially lie in the fact that only one strip-shaped separator foil and accordingly only one unwinding device are needed. Moreover, the separator foil sections surrounding the cathode are in one piece, which is why the cathode is already secured against slipping due to the folded edge of the separator foil that adjoins the contact face of the cathode.

Preferably, a plurality of cathode apparatuses is produced by means of the first variant and/or by means of the second variant of the apparatus. These cathode apparatuses are placed into a magazine and prepared for the production of an electrode assembly.

According to a method for producing an electrode assembly, an anode is provided in a first step. Here, the anode is especially sheet-shaped and it has a first face with a contact.

In a second step, a cathode apparatus produced according to one of the variants presented above is provided for producing the electrode assembly. Within the scope of producing the cathode apparatus according to one of the variants presented above, the separator foil is cut to size, thereby forming the separator foil sections or the separator foil cutouts in such a way that its dimension, that is to say, its extension, in a plane spanned by the separator foil cutouts or by the separator foil sections matches the dimension of the anode.

Subsequently, the cathode apparatus and the anode are stacked on top of each other. The cathode apparatus and the anode are aligned relative to each other by means of a stop. Here, the alignment by means of a stop is made possible due to the matching dimensions of the cathode apparatus and of the anode. Advantageously, thanks to the use of a stop, no optical device is needed by means of which the position and/or the orientation of the cathode apparatus and the separate anode are detected. Consequently, a relatively uncomplicated and cost-saving production process is achieved.

In particular, several cathode apparatuses and several anodes are alternatingly stacked on top of each other using the stop, whereby the dimensions of all of the cathode apparatuses match the dimensions of all of the anodes.

In an advantageous embodiment, a battery, especially a lithium-ion battery, has an electrode assembly that is produced on the basis of the variant presented above. Furthermore, according to an advantageous refinement, a motor vehicle has such a battery.

BRIEF DESCRIPTION OF THE DRAWINGS

Embodiments of the invention will be explained in greater detail below with reference to a drawing. The following is shown there.

Parts and dimensions that correspond with each other are always designated with the same reference numerals in all of the figures.

DETAILED DESCRIPTION OF THE INVENTION

Figure 1:
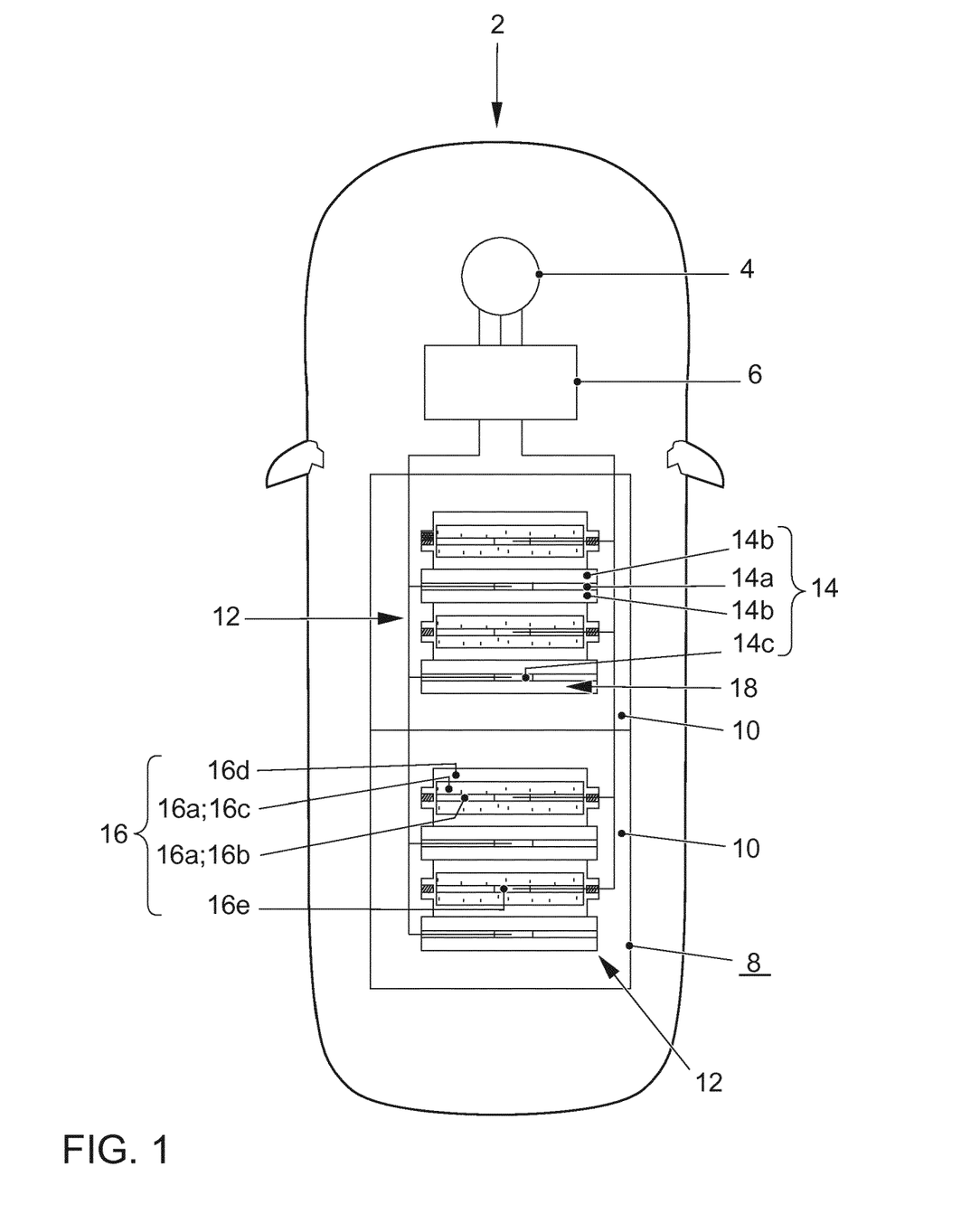
FIG. 1 a schematic view of a motor vehicle with a battery having battery cells, whereby the battery cells have an electrode assembly with an anode and a cathode apparatus, FIG. 2 a schematic view of a first variant of a method for producing the cathode apparatus, whereby a cathode is placed between two separator foils and the separator foils are cut to size, being joined to each other in this process, FIG. 3 a schematic view of a first embodiment of a second variant of the method for producing the cathode apparatus, whereby a single strip-shaped separator foil is folded along the lengthwise direction of the strip and is arranged on both sides of the cathode, FIG. 4 a schematic view of a second embodiment of the second variant of a method for producing the cathode apparatus, whereby the single strip-shaped separator foil is folded along the lengthwise direction of the strip, and whereby the cathode is placed between the separator foil sections of the separator foil, FIG. 5a a top view of a cathode apparatus having a cathode that is placed between the folded separator foil, whereby the separator foil sections of the separator foil that adjoin the flat sides of the cathode are joined to each other, forming a pocket in this process, FIGS. 5b, c sectional views of the cathode apparatus as seen in the sectional planes Vb or Vc of FIG. 5a, and FIG. 6 schematically, a method for producing the electrode assembly.

The motor vehicle 2 shown in FIG. 1 is electrically powered. For this purpose, the motor vehicle 2 has an electric motor 4 that is connected to a battery 8 via a power inverter 6. The battery 8 has a plurality of battery cells 10, whereby, for the sake of greater clarity, only two battery cells 10 are shown. Each of the battery cells 10 holds an electrode assembly 12. Its anodes 14 and its cathode apparatuses 16 are stacked alternatingly on top of each other.

Each of the anodes 14 has an anode foil 14a that is configured, for example, as a copper foil and that is coated on both sides, in other words, on its flat sides, with a first active material 14b, for example, graphite.

Each of the cathode apparatuses 16 has a cathode 16a having a cathode foil 16b, for example, an aluminum foil. It is coated on both sides with a second active material 16c, for example, with a lithium transition metal oxide. Here, the second active material 16c is shown with a dotted surface. In summary, the cathode foil 16b and the second active material 16c form the cathode 16a.

Moreover, the cathode apparatuses 16 have separator foils 16d that cover the cathodes 16a on their flat sides. They contain, for example, polyethylene and/or polypropylene. Thus, the separator foils 16d are arranged between the anodes 14 and the cathodes 16a.

The first face 18 of the anode foil 14a as well as the first face 18 of the cathode foil 16b each have a contact 14c or 16e, respectively, in order to electrically contact the electrodes, in other words, the anodes 14 and the cathodes 16a.

Figure 2:
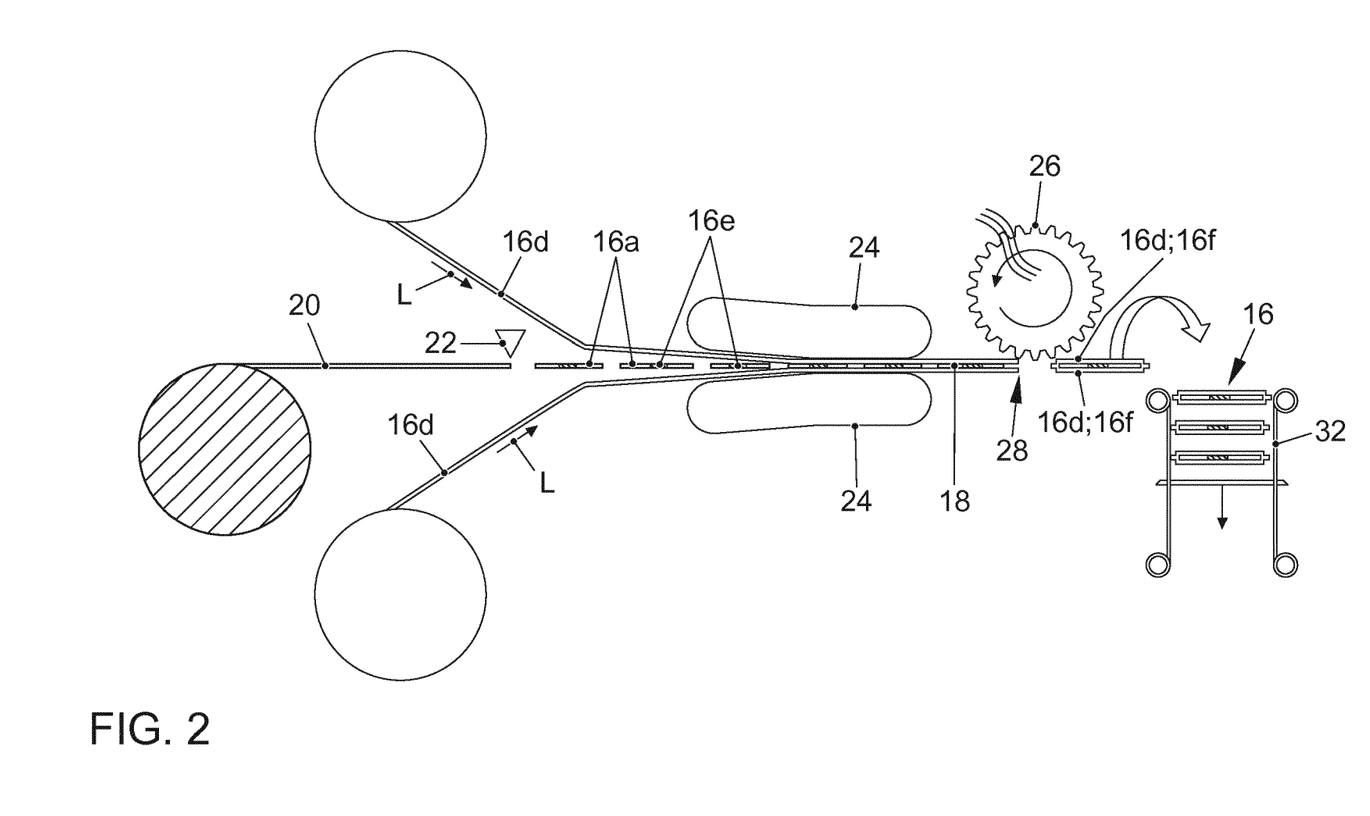

FIG. 2 schematically shows a process sequence for producing the cathode apparatus 16 according to a first variant. In a first step, a cathode strip 20 that is wound up on a roll (coil) is provided. This strip has the cathode foil 16b that is coated with the second active material 16c. In a second step, the cathode strip 20 is unwound and the cathode 16a is cut out at the end by means of a cutting device 22.

In a third step, the cathode 16a is placed between two strip-shaped separator foils 16d that each have a lengthwise direction L of the strip. For this purpose, the separator foils 16d as well as the cathode 16a are moved by a conveyor 24 and stacked on top of each other. In this process, the separator foils 16d are each unwound from a roll (coil). The conveyor 24 has two vacuum belts, whereby their distance from each other decreases in the lengthwise direction of the strip. As a result, the separator foils 16d are pressed together in front of and behind the cathode 16a relative to the lengthwise direction of the strip.

Moreover, the flat cathode 16a sides that adjoin the first face 18 are completely covered by means of the two separator foils 18d. The contact 16e projects sideways from the plane of the drawing beyond the two separator foils 16d, that is to say, in a direction that is perpendicular to the lengthwise direction L of the strip and in a plane spanned by the cathode 16a.

In a fourth step, the two separator foils 16d are cut to size by means of a heated rotary blade 26 that is shown schematically and, for the sake of greater clarity, not true-to-scale, thereby forming appropriate separator foil cutouts 16f. In this process, the two separator foil cutouts 16f fuse together as a result of the thermal effect of the rotary blade. The two separator foils 16d are cut to size and are then fused in an area 28 that projects beyond the cathode 16a in front of and behind the cathode 16a relative to the lengthwise direction L of the strip.

In an alternative, not shown here, the two separator foils 16d are additionally cut to size in the area of a second face 30 that is opposite from the first face 18 and fused together. In this manner, the fused separator foil cutouts 16f form a pocket which securely holds the cathode 16a against slipping.

Subsequently, the cathode apparatus 16 is placed into a magazine 32 and prepared for the production of an electrode assembly 12.

In summary, the two separator foil cutouts are cut to size and fused in one work step.

Figure 3:
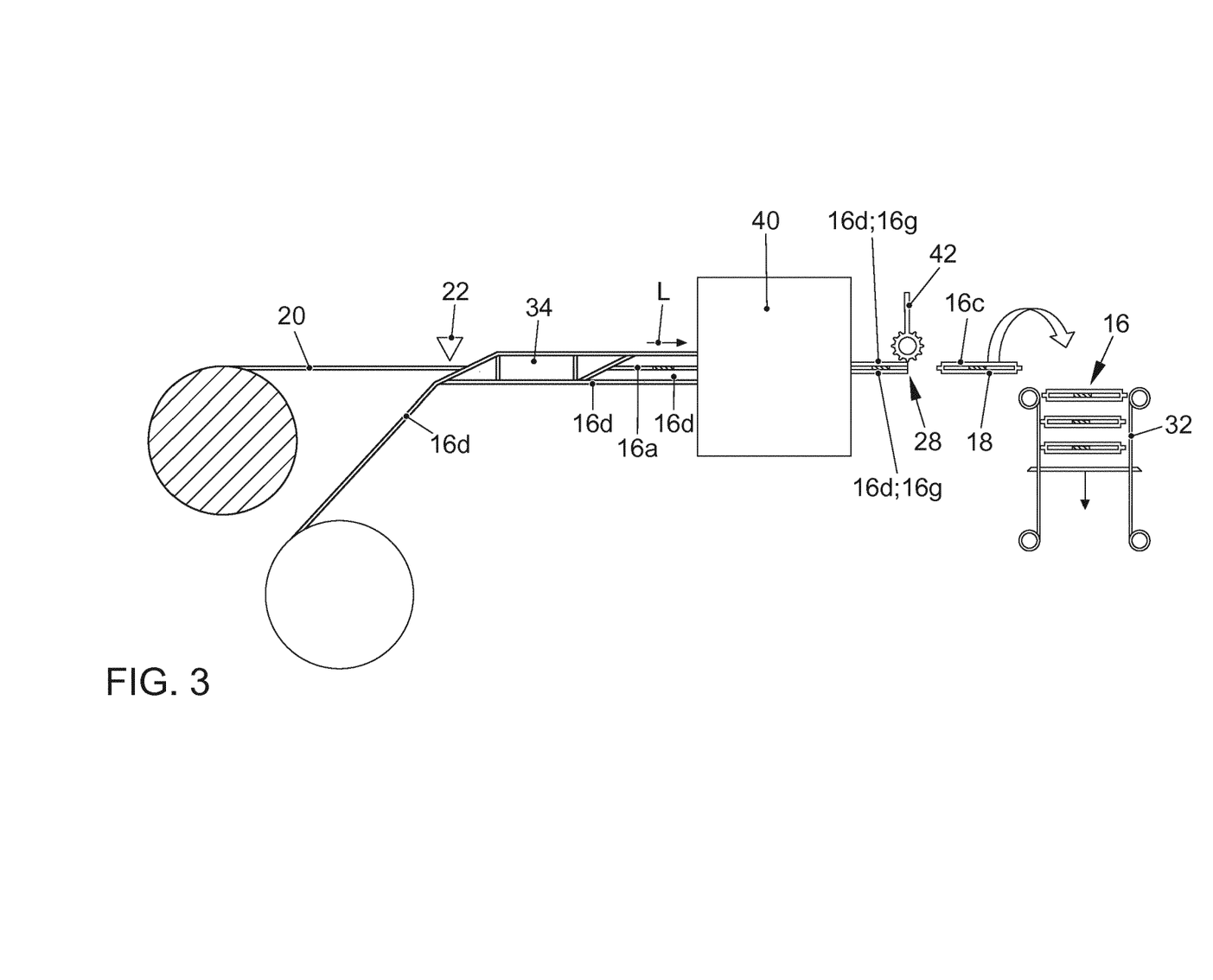

FIG. 3 schematically shows a process sequence for producing the cathode apparatus 16 according to a first embodiment of a second variant of the method. In this process, to start with, the first two steps of the first variant are carried out, that is to say, the cathode 16a is cut out of the cathode strip 20.

In a third step of the first embodiment of the second variant, a single strip-shaped separator foil 16d is folded by means of a folding device 34, thus forming a folded edge 36. Here, the separator foil 16d is folded in such a way that the folded edge 36 runs in the lengthwise direction L of the strip. The folded separator foil 16d is arranged on the cathode 16a in such a way that the folded edge 36 of the separator foil 16a adjoins a contact face 38 of the cathode 16a, whereby here, the contact face 38 is the second face 30 that is opposite from the first faces 18. Here, the cathode 16a is covered on each side by a separator foil section 16g of the separator foil 16d.

Subsequently, in a fourth step, the cathode 16a is laminated with the two separator foil sections 16g by means of a laminating system 40.

Subsequently, in a joint fifth step, the separator foil 16d or the separator foil sections 16g are cut to size by means of a laser 42 in an area 28 in front of and behind the cathode 16 relative to the lengthwise direction L of the strip. In this manner, the separator foil 16d or the separator foil sections 16g are cut to size in an area that projects beyond the cathode 16a and that comprises faces that adjoin the contact face 38. In this process, the two separator foil sections 16g fuse together as a result of the effect of the laser 42 on the separator foil sections 16g.

In a sixth step, the cathode apparatus 16 is placed into a magazine 32 and provided for producing an electrode assembly 12.

Figure 4:
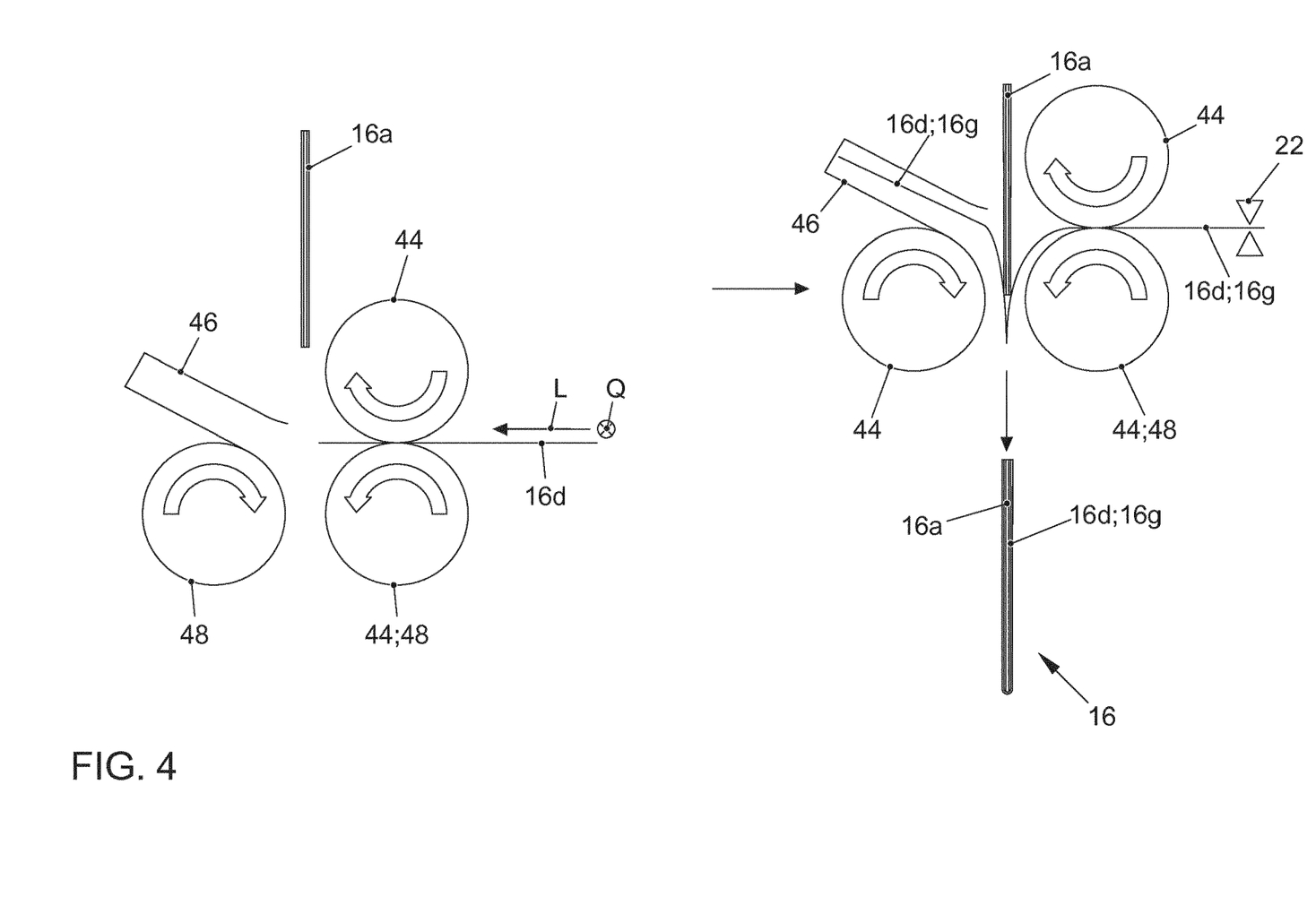

FIG. 4 schematically shows a process sequence for producing the cathode apparatus 16 according to a second embodiment of the second variant of the method. Here, the first two steps are carried out analogously to the first embodiment.

In a third step, the individual strip-shaped separator foil 16d is folded by means of the folding device 34, thereby forming the folded edge 36, but in such a way that the folded edge 36 runs perpendicular to the lengthwise direction L of the strip and parallel to the flat side of the separator foil 16d, that is to say, in the crosswise direction Q of the strip. For this purpose, conveying rollers 44 place the end of the separator foil 16 into a receptacle 46 that is slanted counter to the conveying direction, thereby forming the two separator foil sections 16g, a process in which the slant of the receptacle 46 facilitates the folding procedure.

In a fourth step, the separator foil is cut to length perpendicular to the lengthwise direction L of the strip, namely, by means of another cutting device 22, and the cathode 16a is placed between the two separator foil sections 16g.

In a fifth step, the cathode 16a is laminated with the separator foil sections 16g by means of laminating rollers 48. Here, the conveying roller 42 that is also used as the laminating roller 44 is the one that faces away from the side of the separator foil 16d from which the cathode 16a is placed between the separator foil sections 16g.

In a sixth step, not shown here, the cathode apparatus 16 is placed into a magazine 32 in an analogous manner and provided for producing an electrode assembly 12.

Figure 5A:
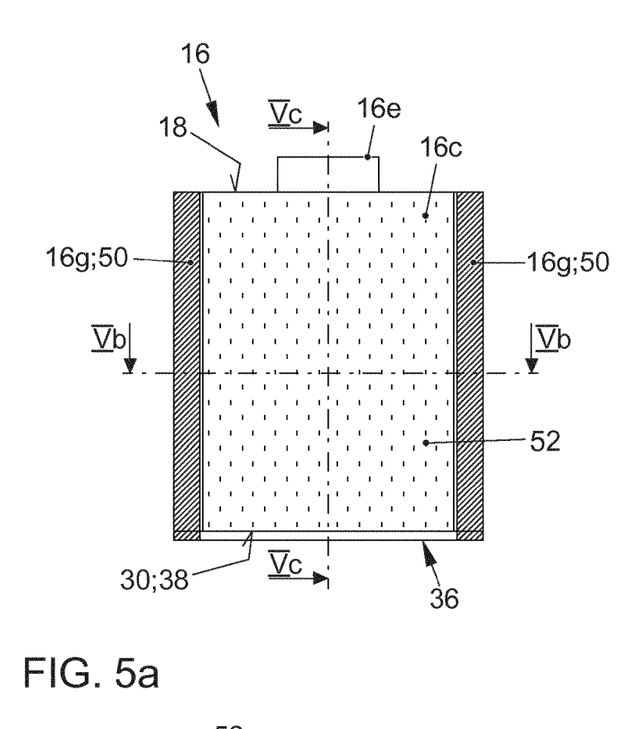
Figure 5B:
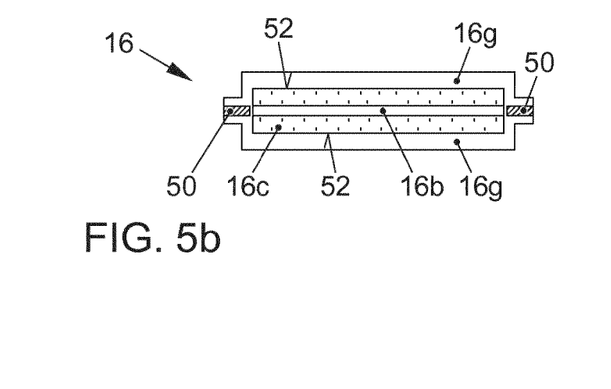
Figure 5C:
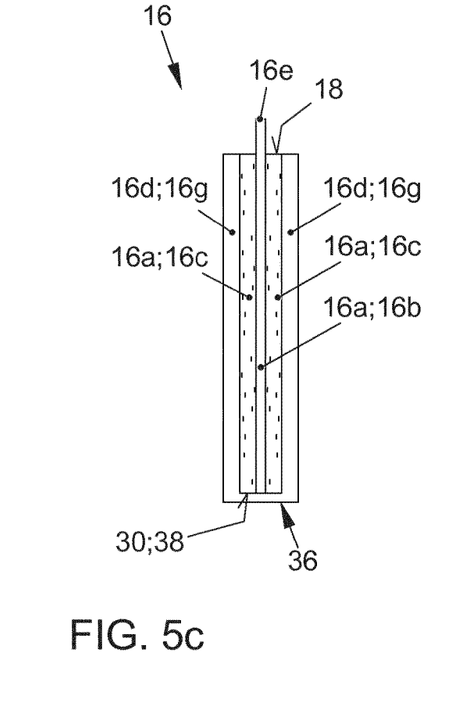

FIGS. 5a to 5c show the cathode apparatus 16 produced according to the second variant of the method. The second face 30—which was used as the contact face 38 and which is opposite from the first face 18—adjoins the folded edge 36 of the separator foil 16d. Therefore, the separator foil 16d surrounds the cathode 16a. For the sake of greater visibility of the second active material 16c, the separator foil 16d is shown in FIG. 5a as if it were transparent. The areas 50 of the two separator foil sections 16g that are fused together, that is to say, that are joined together, are shown with cross-hatching here. They extend in the area of the faces that adjoin the first face 18 and the second face 30. Since the two separator foil sections 16g and the folded edge 36 are fused, the separator foil 16d forms a pocket which securely holds the cathode 16a against slipping. The flat sides of the cathode 16a that have been laminated with the separator foil sections 16g are designated by the reference numeral 52.

Figure 6:
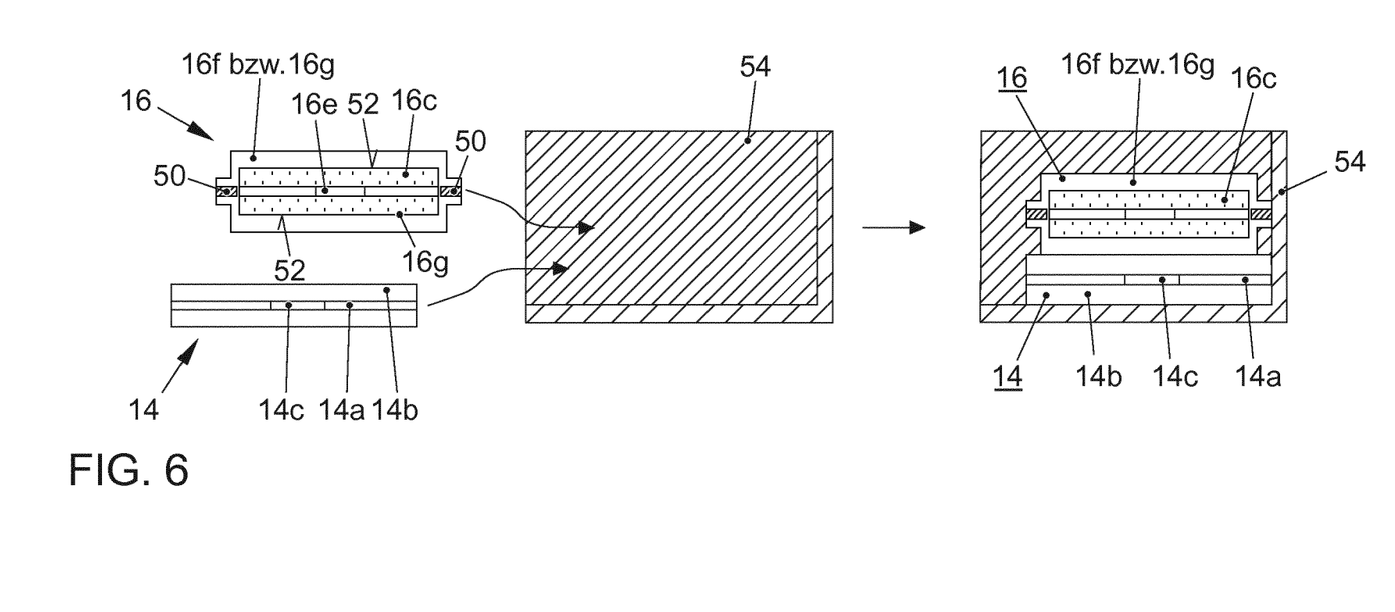

FIG. 6 schematically shows a process sequence for producing the electrode assembly 12. The anode 14 is provided in this process. The cathode apparatus 16 was produced in one of these methods as described above in such a way that its dimension, that is to say, its extension in a plane spanned by its separator foil cutouts 16f or by its separator foil sections 16g, matches the dimension of the anode 14, that is to say, its extension in a plane spanned by the anode foil 14a.

For this purpose, in the first variant and in the first embodiment of the second variant of the method for producing the cathode apparatus 16, the separator foil cutouts 16f or the separator foil sections 16g are appropriately cut to size. When the cathode apparatus 16 is produced according to the second embodiment of the second variant of the method, the extension of the separator foil 16d in the crosswise direction Q of the strip is selected accordingly or, as an alternative, cut to size accordingly. For this purpose, for example, the laser 42 is used so that the two separator foil sections 16g are fused together in the appertaining areas.

Subsequently, the cathode apparatus 16 and the anode 14 are stacked on top of each other. In this process, the cathode apparatus 16 and the anode 14 are aligned relative to each other by means of a stop 54. For the sake of greater clarity, the portion of the stop 54 that is arranged behind the anode 14 or behind the cathode apparatus 16 as seen in the view towards the plane of the drawing is shown with more cross-hatching than the L-shaped portion of the stop 54 that runs perpendicular to the plane of the drawing.

The invention is not limited to the embodiments described above. On the contrary, other variants of the invention can be derived by the person skilled in the art without departing from the subject matter of the invention. In particular, all of the individual features described in conjunction with the embodiments can also be combined with each other in any desired manner without departing from the subject matter of the invention.

LIST OF REFERENCE NUMERALS 2 motor vehicle
4 electric motor
6 power inverter
8 battery
10 battery cell
12 electrode assembly
14 anode
14a anode foil
14b first active material
14c contact
16 cathode apparatus
16a cathode
16b cathode foil
16c second active material
16d separator foil
16e contact
16f separator foil cutout
16g separator foil section
18 first face
20 cathode strip
22 cutting device
24 conveying device 26 rotary blade
28 area
30 second face
32 magazine
34 folding device
36 folded edge
38 contact face
40 laminating system
42 laser
44 conveying rollers
46 receptacle
48 conveying rollers
50 fused area
52 laminated area
54 stop
L lengthwise direction of the strip
Q crosswise direction of the strip

The invention claimed is:

1. A method for producing a cathode apparatus for a battery, comprising:
providing a cathode strip,
cutting a cathode out of the cathode strip,
placing the cathode between two strip-shaped separator foils, and
in a joint step, cutting the two separator foils to size in an area that protrudes beyond the cathode, thereby forming corresponding separator foil cutouts, and joining the resulting two separator foil cutouts to each other in this area by fusing them together,
wherein, in the joint step, a heated rotary blade is used to cut and to join the two separator foil cutouts.

2. A method for producing a cathode apparatus for a battery, comprising:
providing a cathode strip,
cutting a cathode out of the cathode strip,
folding and arranging a single strip-shaped separator foil on the cathode, thus creating a folded edge along a lengthwise direction of the strip, in such a way that the folded edge of the separator foil adjoins a contact face of the cathode and that the cathode is covered on both sides by a separator foil section of the separator foil,
in a joint step, cutting the separator foil to size in an area of the faces of the cathode extending beyond the cathode, said area facing away from the contact face, and joining the resulting two separator foil sections to each other by fusing them together,
wherein, in the joint step, a heated rotary blade is used to cut and to join the two separator foil cutouts.

3. The method according to claim 2, further comprising laminating the cathode with the separator foil sections in one single step before the separator foil is cut to size.

4. A method for producing an electrode assembly, comprising
providing an anode,
producing a cathode apparatus according to claim 2 which is cut to size in such a way that a dimension of its separator foil sections matches a dimension of the anode, and
stacking and aligning the anode and the cathode apparatus relative to each other by means of a stop.

5. A battery having an electrode assembly produced according to claim 4.

6. A motor vehicle having a battery according to claim 5.

7. The method according to claim 1, further comprising laminating the cathode with the separator foil cutouts in one single step before the separator foils are cut to size.

8. A method for producing an electrode assembly, comprising
providing an anode,
producing a cathode apparatus according to claim 1 which is cut to size in such a way that a dimension of its separator foil cutouts matches a dimension of the anode, and
stacking and aligning the anode and the cathode apparatus relative to each other by means of a stop.

9. A battery having an electrode assembly produced according to claim 8.

10. A motor vehicle having a battery according to claim 9.

* * * * *